(12) United States Patent
Albrecht et al.

(10) Patent No.: US 12,553,923 B2
(45) Date of Patent: Feb. 17, 2026

(54) ELECTRICAL STATE MONITORING RELATED TO A POWER CABLE

(71) Applicant: AiQ Dienstleistungen UG (haftungsbeschränkt), Böblingen (DE)

(72) Inventors: Ralf Albrecht, Böblingen (DE); Gareth Lees, Hants (GB)

(73) Assignee: AIQ DIENSTLEISTUNGENUG, Boblingen (DE)

(*) Notice: Subject to any disclaimer, the term of this patent is extended or adjusted under 35 U.S.C. 154(b) by 96 days.

(21) Appl. No.: 18/509,107

(22) Filed: Nov. 14, 2023

(65) Prior Publication Data

US 2024/0159800 A1 May 16, 2024

(30) Foreign Application Priority Data

Nov. 15, 2022 (EP) .................................. 22207503

(51) Int. Cl.
*G01R 15/24* (2006.01)

(52) U.S. Cl.
CPC .................................. *G01R 15/24* (2013.01)

(58) Field of Classification Search
CPC .... G01R 15/24; G01R 31/58; G01D 5/35361; G01H 9/004
USPC ........................................................ 324/126
See application file for complete search history.

(56) References Cited

U.S. PATENT DOCUMENTS

| 7,469,078 B2 | 12/2008 | Niewczas et al. |
| 8,661,907 B2 | 3/2014 | Davis et al. |
| 11,143,717 B2 | 10/2021 | Gordon et al. |
| 2012/0017687 A1 | 1/2012 | Davis et al. |
| 2018/0180658 A1* | 6/2018 | Godfrey ................. G01R 33/02 |
| 2019/0186958 A1* | 6/2019 | Godfrey ............ G01D 5/35354 |
| 2019/0369170 A1* | 12/2019 | Ramos ............... G01R 33/0327 |
| 2021/0026308 A1 | 1/2021 | Brinson et al. |
| 2021/0103007 A1* | 4/2021 | Gordon ................ G01R 15/181 |

FOREIGN PATENT DOCUMENTS

| CN | 207866878 U | * 9/2018 | |
| CN | 112763051 A | * 5/2021 | ............. G01H 9/004 |
| GB | 2480991 A | 12/2011 | |
| GB | 2561821 A | 10/2018 | |
| GB | 2584279 A | 12/2020 | |
| JP | 9-270090 A | 10/1997 | |
| WO | WO-2022136832 A1 | * 6/2022 | ......... G01D 5/35361 |

OTHER PUBLICATIONS

Extended European Search Report of EP 22 207 503.8, Mar. 29, 2023, 8 pages.

* cited by examiner

*Primary Examiner* — Arleen M Vazquez
*Assistant Examiner* — Robert P Alejnikov, Jr.
(74) *Attorney, Agent, or Firm* — Womble Bond Dickinson (US) LLP

(57) ABSTRACT

An arrangement for obtaining electrical state information related to an electrical power cable comprising at least one current sensor, at least one electrical-mechanical transducer arranged in order to receive a current sensor signal based driving signal and adapted to generate a mechanical response at a response surface based on the driving signal, a distributed acoustic sensing equipment, comprising at least one first optical fibre, and a processing portion adapted to process detected first Rayleigh backscattered light in order to at least determine the value of a current related to the power cable.

17 Claims, 4 Drawing Sheets

ELECTRICAL STATE MONITORING RELATED TO A POWER CABLE

CROSS-REFERENCE TO RELATED APPLICATION

This application claims priority to European Patent Application Number 22 207 503.8, filed on Nov. 15, 2022, the entire content of which is incorporated herein by reference.

FIELD OF INVENTION

The present invention relates to an arrangement and a corresponding method for obtaining electrical state information related to an electrical power cable. The arrangement comprises a distributed acoustic or vibration sensing equipment.

ART BACKGROUND

Distributed fibre optic sensing is a well-established technology for condition monitoring and fault detection or event detection along a route of a fibre optic cable. Thereby, for example, the state of an electrical power cable, a pipeline or other elongate structures can be monitored. The areas of application of distributed fibre optic sensing range from heat detection (employing for example distributed temperature sensing) in critical infrastructures via distributed temperature sensing (DTS) to seismic data acquisition and geophysical events via distributed acoustic sensing (DAS). Fibre optic sensing may widely be used for power cable monitoring. Even though conventionally, fibre optic sensing may offer the possibility to monitor environmental changes, to determine conductor temperatures and loud acoustic events, conventionally, fibre acoustic sensing can hardly identify the causes of a potential cable fault.

GB 2 480 991 A discloses a fibre optic distributed acoustic sensing of remote sensor signals. In the disclosed system, a plurality of sensors output information into a distributed acoustic sensing (DAS) system via acousto-mechanical signals. The sensors are coupled to the optic fibre at the centre of the DAS system indirectly, the acousto-mechanical signal being transmitted via an intermediary body such as the ground or a conduit.

GB 2 561 821 A1 discloses multi-phase sensor modules, systems and methods, wherein a phase-to-phase voltage measurement in a multi-phase power cable is enabled. A voltage sensor is disposed on a spacer to be located between the conductors and the sensor comprises a fibre Bragg grating in contact with a piezoelectric element which expands and contracts in response to the voltage between the two conductors, resulting in fibre Bragg grating signals dependent on the phase-to-phase voltage.

U.S. Pat. No. 7,469,078 B2 discloses a system for remote measurements for measuring simultaneously both temperature and AC voltage and/or AC current. A piezoelectric sensor and an optical fibre are comprised in the system, the optical fibre including an optical strain sensor being in contact with the piezoelectric sensor and able to expand or contract therewith and an analyser for analysing an optical output of the fibre and strain sensor in response to an optical input, the analyser being operable to use the optical output to determine the temperature and the AC voltage and/or AC current. The system employs several fibre Bragg gratings attached to a piezo-electric element.

GB 2 584 279 B describes a method and apparatus for precisely time-stamping a signal/event at a position along the fibre. The apparatus is based on a highly time-resolved measurement of fibre Bragg gratings positioned along the fibre.

US 2019/0369170 A1 discloses an electric monitoring optical fibre package for an electrical monitoring sensing system for monitoring and adjusting the electric and magnetic properties of an electric system or cable. A portion of an optical fibre is coated with a coating material, in order to provide at least one sensing portion. Changes in the electromagnetic field of the cable is captured by the coating and translated into strain applied to the fibre which can be read out.

JPH 09270090 A discloses a detection method for detecting distributed information from a plurality of sensors by reliably identifying the information using optical fibres.

The conventional systems and methods have several disadvantages or shortcomings.

Thus, there may be a need for an arrangement and a corresponding method of obtaining electrical state information related to an electrical power cable, wherein complexity is reduced and reliability and operability is improved.

SUMMARY OF THE INVENTION

The need is satisfied by the subject-matter of the independent claims being directed to an arrangement and a method, respectively, of obtaining electrical state information related to an electrical power cable. Advantageous embodiments of the present invention are described by the dependent claims.

According to an embodiment of the present invention it is provided an arrangement for obtaining electrical state information related to an electrical power cable, the arrangement comprising: at least one current sensor arrangeable at at least one measurement location and adapted to generate a current sensor signal indicative of a value of an electrical current related to the electrical power cable; at least one electrical-mechanical transducer arranged in order to receive a current sensor signal based driving signal and adapted to generate a mechanical response at a response surface based on the driving signal; a distributed acoustic sensing equipment, comprising: at least one first optical fibre having a first end and a second end, a contact portion of the first optical fibre between the first end and the second end being mechanically in contact with the response surface; an interrogation system adapted to generate temporally successively optical pulses and coupleable to the first end of the first optical fibre in order to inject the optical pulses into the first optical fibre (e.g. at the first end of the first optical fibre) and adapted to detect first Rayleigh backscattered light returning from the first optical fibre in a time resolved manner; a processing portion adapted to process the detected first Rayleigh backscattered light in order to at least determine the value of the current.

The electrical power cable may be an onshore or offshore power cable. The electrical power cable may be buried in the soil or in the sea ground. The electrical power cable may comprise several conductor strands, such as three strands, for different phases, such as three phases. Each conductor strand may be surrounded by an insulating material which may in turn be surrounded by a sheath conductor or sheath conductor strand that may act as a capacitive and inductive return path, a fault current return path and earth potential for human safety. The current carried in the metallic sheath may be measured according to embodiments of the present invention. The electrical power cable may convey electric power at a high voltage, such as in the range between 200 kV and 250 kV or at medium voltage, such as in the range between 600 V and 100 kV. The electrical power cable may have a diameter between 10 cm and 30 cm, for example.

The arrangement may be adapted to for example measure a current which is carried in one or more of the phase conductors and/or one or more of the screen conductors.

The arrangement may be capable of measuring and/or obtaining current related measurement values relating for plural locations along the electrical power cable. For each of the one or plural measurement locations, a respective current sensor may be provided.

The current sensor may be capable or adapted to sense an intensity of a current conveyed in one or more conductors comprised in the electrical power cable. The current sensor not necessarily contacts any conductor of the electrical power cable directly but may sense the current due to an electromagnetic interaction, such as voltage induction due to a changing magnetic field generated within the conductor(s) of the electrical power cable. For performing the current measurement, the current sensor may not require a particular power source. Any electric current conveyed in a conductor of the electrical power cable may be sufficient to be present for the current sensor to be capable of determining or generating the current sensor signal. The current sensor may not require or comprise electronic components or power supplies. The current sensor may require or comprise no active electronic components. The current in the conductor to be measured itself may cause the current sensor signal to emanate via induction.

The current sensor signal may be a signal which may vary in dependence of the value of the electrical current, which may in particular be proportional to the value of the electrical current. The current sensor signal may for example be represented by a measurement voltage. The current sensor may be arranged in close proximity to a conductor of the electrical power for which the corresponding current is to be measured. The current sensor (or portions thereof) may for example at least partially or completely surround the respective electrical conductor.

The electrical-mechanical transducer may be arranged to transduce an electrical input signal, such as a voltage signal, into a mechanical response which is provided at the response surface. The transducer may for example comprise piezo-electric material which expands or contracts in dependence on a voltage applied to different ends or portions of the piezoelectric material. The transducer may have any shape.

The response surface may have any shape and may be a solid surface. The response surface is preferably exposed at an outer surface of the transducer. The response surface may comprise the piezoelectric material or may at least mechanically coupled to the piezoelectric material such that expansion or contraction of the piezoelectric material is transferred to or occurs at the response surface. In this sense the response surface may present a mechanical (e.g. vibrational) response towards the contact portion of the first optical fibre. In particular, the response surface may be adapted such that the contact portion of the first optical fibre can be wound or in general brought in physical (e.g. direct) contact with the response surface. Due to direct physical contact, no sound waves may be involved to transmit the mechanical response from the response surface toward the fibre portion. Further, a reliable transfer of the signal amplitude (e.g. of the mechanical response) is enabled, in particular without requiring coding or conditioning.

The contact portion of the first optical fibre may be brought in contact with the response surface and may further be glued to the response surface, for fixing the contact portion of the first fibre to the response surface. The length of the contact portion of the first optical fibre may be for example between 1 m and 50 m. The contact portion may for example be wound in one or several layers around or to the response surface. Thus, not all parts of the contact portion are necessarily in direct contact with the response surface. In other embodiments, the entire length of the contact portion of the first optical fibre may be in direct (or indirect) contact with the response surface, optionally some glue may be applied between the response surface and the contact portion of the first optical fibre.

The fibre portion in contact with the response surface may have some pre-tension, e.g. for firm contact.

Not the whole fibre contact portion needs to be glued, just gluing or clamping at two or more locations may be sufficient, the stretches in between the glued locations being free of glue.

The electro-mechanical transducer may be adapted to change its extension, for example diameter or length, in response to the driving signal. The electro-mechanical transducer may be adapted to change its shape or bending state, for example curvature of bending, in response to the driving signal.

The driving signal may depend on or may be the current sensor signal itself. The driving signal may be a voltage driving signal.

The current in the conductor of interest of the electrical power cable may oscillate for example with an expected frequency, such as 50 Hz or 60 Hz. The electrical-mechanical transducer may be adapted to be responsive to changes in the driving signal in the range of frequencies between for example 10 Hz and 500 Hz, for example.

The current in the conductor of interest of the electrical power cable may oscillate for example at a frequency of 50 Hz or 60 Hz but also contains residual currents and current components at higher frequencies which can be detected by the current sensor and subsequently processed up to the measurement bandwidth of the interrogation system. Thus, the current sensor and/or the interrogation system may be adapted to measure one or more frequency components or range(s) of a current carried in the conductor of interest.

The bandwidth may or may not limited by the properties of the electrical-mechanical transducer. The components (e.g. current transformer+transducer) may respond linearly to the applied current/voltage. Non-linear/higher frequency response of the piezo element may arise from the geometrical ratios and the associated resonance frequencies of the body.

The electrical-mechanical transducer may be adapted to generate periodic or oscillating expansion and contraction (as a mechanical response) at the response surface which may be transmitted to the fibre portion.

The electro-mechanical transducer may not require any dedicated power supply other than the driving signal which, according to an embodiment, may be represented by the current sensor signal itself. A change in the extent of the transducer, in at least one direction, may be (transferred or) sensed by the first optical fibre causing corresponding strain (or length) changes within the first optical fibre, in particular within the contact portion of the first optical fibre in dependency of the mechanical response at the response surface of the transducer. Thus, an oscillating current being conveyed in one of the conductors of the electrical power cable may be transformed into a varying strain (or length) generated in the contact portion of the first optical fibre.

These temporarily changing or in particular oscillating strain variations are then optically detected using the interrogation system. In particular, the interrogation system may comprise a light source, such as a laser or laser diode, which is configured to generate coherent light, for example light in the visible wavelength range or in the invisible wavelength range, e.g. near infrared. The interrogation system may be employed to inject and detect light of a single wavelength or of a single wavelength range. For example, it may not be necessary to scan across different wavelengths and inject and detect different light pulses having different wavelengths. Further, any particular polarisation may not be required or the interrogation system may inject and detect light having a particular fixed polarisation. The wavelength of the injected light may substantially be equal to the wavelength of the detected light. Any other light having wavelengths or frequencies different from the frequency or wavelength of the light injected may be disregarded. The time duration between injecting two successive pulses may depend on the length of the entire fibre portions. The two successive optical pulses may be injected, such that a second pulse is only injected after all backscatter light due to the injection of the first pulse has left the entire optical fibre system.

The time between pulses may be shorter than half the period of the current to be measured.

The contact portion of the first optical fibre or in general the first optical fibre may be characterised by an optical refractive index. The contact portion or also in particular the entire first optical fibre may not comprise any fibre Bragg gratings. The first optical fibre, in particular the contact portion of the first optical fibre, may be void of any spatially periodic refractive index variations. The refractive index of the contact portion of the first optical fibre may not vary more than for example or 0 to 0.1%, at least not in a periodic fashion. Thus, the refractive index of the contact portion of the first optical fibre or the entire first optical fibre may be substantially homogeneous across its entire length. The contact portion of the first optical fibre or the entire first optical fibre may be suitable for performing conventional distributed acoustic sensing. Thus, the contact portion of the first optical fibre may not comprise any dedicated structural impressions or structural patterns, in particular does not comprise any regular lattices. Thus, the contact portion or the entire first optical fibre may be void of any fibre Bragg gratings.

The first Rayleigh backscattered light is light which is generated due to Rayleigh backscattering within the first optical fibre, in particular within the contact portion of the first optical fibre. Thereby, the first Rayleigh backscattered light carries information regarding strain variations of the contact portion of the first optical fibre which in turn is due to current variations within a conductor of the electrical power cable. Thus, monitoring the electrical state related to an electrical power cable is enabled and is achieved in a simple manner. Thereby, it may for example be possible to identify causes of cable faults which may for example involve damage of cable insulations or open or short circuits of cable screens in accessories or cross-bonding boxes at important locations like cross-bonding boxes, for example.

According to a particular embodiment of the present invention, a current transformer may be utilized as a current sensor whose signal may then be transformed into a proportional strain which can be read out by the DAS unit also referred to as interrogation system. In particular, current measurements may be performed in remote locations and may be relayed via the optical fibre and received by a distributed acoustic sensing instrument. Thereby, the sensors may involve or comprise (exclusively) passive sensor modules.

According to an embodiment of the present invention, the distributed acoustic sensing equipment further comprises a second optical fibre, in particular arranged along a first cable portion, having a first end and a second end, the first end of the second optical fibre being coupled or coupleable to the launch and interrogation system, the second end being coupled or coupleable to the first end of the first optical fibre, the interrogation system being adapted to inject the optical pulses into the first optical fibre via injection into the second optical fibre and further being adapted to detect second Rayleigh backscattered light returning from the second optical fibre, the second Rayleigh backscattered light being due to Rayleigh backscattering within the second optical fibre; the processing portion being further adapted to process the second Rayleigh backscattered light in order to determine at least one acoustical disturbance along the second optical fibre, in particular indicative of at least one acoustical event at the cable, in particular indicative of at least one acoustical event in a first cable portion of the cable.

The interrogation system may either be directly connected to the first optical fibre or may be connected to the first optical fibre via the second optical fibre. The second optical fibre may not necessarily be required in order to perform the current measurement itself. However, a second optical fibre may be advantageous, in order to allow conveyance of the respective sensor signals via optical readout from one or more remote locations. The length of the second optical fibre may for example range between 100 m and 50 km, or between 100 m and 10 km, for example. Using the second optical fibre, conventional distributed acoustic sensing may be employed along the second optical fibre, in addition to obtaining the electrical state information, in particular obtaining current value of one conductor of the power cable at the measurement location. Thus, the arrangement may be configured to provide two distinct functionalities, namely current monitoring at one or more remote locations as well as distributed acoustic sensing in sections between the one or plural measurement locations. Thereby, a thorough monitoring for example of an electrical power cable regarding for example acoustical disturbance (or damage) and current state monitoring may be achieved.

According to an embodiment of the present invention, at least one of the following holds: the current sensor is passive and is operable to generate the current sensor signal without requiring a dedicated power supply; the electrical-mechanical transducer is electrically connected to the current sensor to receive the current sensor signal as the driving signal; the electrical-mechanical transducer is driven by the current sensor signal without requiring a dedicated power supply.

When the current sensor and/or the electrical-mechanical transducer are passive elements, maintenance of the current measurement equipment (in particular at remote or non-accessible locations) may be simplified or even obsolete and reliability may be improved. Thereby also the monitoring may be improved, without requiring maintenance intensive components.

According to an embodiment of the present invention the current sensor comprises a secondary coil inductively coupled to at least one wire of interest of the electrical power cable for which the current value is to be determined, the output voltage and/or current of the secondary coil providing the current sensor signal, the secondary coil substantially surrounding the wire of interest and in particular measuring the current indirectly and non-invasively.

The current sensor or secondary coil may not electrically contact the conductor of interest, the current may be measured via the influence of a magnetic field on the secondary coil.

The power cable or the conductor of interest or any insolation may not be damaged, no punctation may be necessary.

According to an embodiment of the present invention, the conductor of interest of the electrical power cable for which the respective current is to be measured, may represent or be considered as a primary coil or wire/conductor. When an oscillating or at least changing current is conveyed in the conductor of the electrical power cable, a voltage may be induced in the secondary coil by electromagnetic induction. The secondary coil may not be connected to any power source. The output voltage of the secondary coil may itself provide the current sensor signal or the output voltage and/or current of the secondary coil may be run for example through a conditioning circuit, as required by the particular application.

The secondary coil may comprise a magnetic core which may substantially form a ring which may substantially surround the conductor of interest. Thereby conventional elements can be employed for implementing embodiments of the present invention.

According to an embodiment of the present invention, the current sensor comprises a burden resistor connected in parallel to the secondary coil, the current sensor signal being a voltage provided between two terminals parallel to the resistor, in particular being proportional to the current value.

The current sensor signal may for example be a measurement voltage being generated between two terminals. The burden resistor may with its both ends be connected to these two terminals. The resistance of the resistor may be selected or provided, to suit the particular application, in particular to provide a desired accuracy or measurement range of the electrical current. Further, the resistance of the burden resistor may be adapted according to the electrical characteristics of the electrical-mechanical transducer as well as to the electrical characteristics, for example of the secondary coil.

The resistance of the resistor may be selected or adapted to align or match the strain (variation) experienced by the contact portion of the fibre to the sensitivity range of the interrogation system.

Thus, the burden resistor may allow to adapt the co-functioning of the different elements and/or scaling.

According to an embodiment of the present invention, the current sensor is responsive to a temporal change of the current value and/or exploits voltage induction caused by the current, wherein the current sensor is in particular configured as a current transformer. Thereby, a conventionally available element may be supported thereby simplifying implementing embodiments of the present invention.

According to an embodiment of the present invention, the current sensor is arranged to measure a value of a sheath current carried in the cable sheath of the electrical cable, in particular being a sheath cable surrounding a wire strand of one phase of the power cable.

Conventionally, a power cable may be laid out in different sections which then need to be connected at the installation site. At the junction of the two sections of the electrical power cable, also the cable screen may be exposed providing the opportunity to measure respective currents being carried in the cable screen. Conventionally, different screen conductors of different phases of the electrical power cable of two neighbouring sections are crossed and then connected to each other. Further, in separate locations the screen conductors of different phases of the electrical power cable are connected to the earth.

The Earthing and cross-bonding may be performed in two different (separate) locations. There may be provided earthing box(es) and separate cross-bonding box(es).

The measurement location may be situated at such a junction point of joining two sections of an electrical power cable. The screen conductor current may be indicative for example of a damage of the constitution of a portion of the electrical power cable, for example a damage in an insulation. Advantageously, at such a junction point, the respective screen conductors are already easily accessible. To one or more of the screen conductors merely one or more respective current transformers may be applied and the respective electrical current sensor signals may be supplied to a corresponding electrical-mechanical transducer, as has been described above. Thereby, obtaining state information related to an electrical power cable may be simplified and implemented without excessive burden.

According to an embodiment of the present invention, at least one of the following holds: the electrical-mechanical transducer comprises a piezo-element providing the response surface at an outer surface, the response surface substantially has a cylinder symmetry, in particular circular cylinder shape, wherein a contact fibre portion of the first optical fibre is wound around the cylinder outer surface, in particular several times.

The electrical-mechanical transducer not necessarily is of cylindric shape, the fibre is also not required to be wound around the piezo-electric element. The fibre may just be glued to a piezo-electric stack (not having cylindrical shape), no winding of the fibre may be required.

A piezo-element may be an element which changes its extent and/or bend or shape at least in one direction in response to an applied voltage. When the response surface substantially has a cylinder symmetry, (e.g. firmly) winding the contact portion of the first optical fibre around the response surface or at the response surface may be simplified and a firm contact of the contact portion may be ensured. Further, the contact portion of the first optical fibre may not be bent excessively but only to an extent within its inherent flexibility. The transducer may for example change its radial dimension in proportion or in response to a changing driving signal. Thereby, conventionally available elements are supported from implementing embodiments of the present invention.

According to an embodiment of the present invention, the arrangement further comprises a casing having a casing wall enclosing a reception space, the reception space containing the at least one electrical-mechanical transducer including the contact portion of the first optical fibre at least partially in contact to the response surface, the current sensor being arranged outside the reception space, the casing wall being equipped with: a first optical fibre connector allowing to couple the second end of the second optical fibre with the first end of the first optical fibre; at least one measurement signal input for receiving the at least one current sensor signal.

According to an embodiment of the present invention, the first and second optical fibre are spliced together, in particular without any connector, or may even represent to portions of a single integrally formed fibre.

The casing may protect the sensitive first optical fibre and also the transducer from damage. The current sensor may be arranged close to or at the respective conductor for which the current is to be measured but outside the casing. The first optical fibre connector may comprise a portion inside the casing allowing the first end of the first optical fibre to be coupled and may comprise an outer portion in order to couple the second end of the second optical fibre. The measurement signal input may comprise two electrical terminals, for example, in order to receive for example a measurement voltage.

According to an embodiment of the present invention, at least one of the following holds: the casing wall being further equipped with a second optical fibre connector allowing to couple the second end of the first optical fibre with a third optical fibre; the first optical fibre connector and/or second optical fibre connector comprising at least one strain relief element; the reception space further contains at least one further electrical-mechanical transducer having a further response surface with which a further contact portion of the first optical fibre is in contact, the further electrical-mechanical transducer being driven by a further driving signal which is based on a further current sensor signal generated by a further current sensor; at least one fibre spool element holding/receiving an intermediate part of the first optical fibre between the contact fibre portion and the further contact fibre portion of the first optical fibre.

The third optical fibre may be arranged along for example a second portion of the power cable and may lead to a further casing containing a further electrical mechanical transducer which is connected to a further current sensor arranged at a further measurement location. Thereby, it may be enabled to perform current monitoring at plural measurement locations along the electrical power cable. The fibre spool element may ensure that the strain variations experienced at the contact fibre portion and the further contact fibre portion can be separated in a more distinct manner by the distributed optical sensing equipment, in particular the interrogation system. Thereby, sensitivity and/or reliability and/or flexibility may be improved.

According to an embodiment of the present invention, the processing portion is configured to process the detected first Rayleigh backscattered light by: extracting at least one frequency component corresponding to an AC frequency of the current expected to be carried in a wire of interest of the electrical cable, the frequency being in particular 50 Hz or 60 Hz; determining an amplitude of the frequency component.

According to an embodiment of the present invention, the processing portion is configured to process the detected first Rayleigh backscattered light by: extracting the strain that is proportional to the current expected to be carried in a conductor of interest. The amplitude of the time varying strain signal at 50 Hz or 60 Hz is proportional to the current amplitude of the current to be measured.

Extracting the frequency component may involve to perform a Fourier transformation of a (processed) detection signal, the processed detection signal indicating strain information along the optical fibre. Processing of the detected first Rayleigh backscattered light may involve phase extraction, as explained in WO2012030814 (A2), the content of which is incorporated by reference.

The amplitude of the particular frequency component may in particular be proportional to the value of the current conveyed in the conductor of the electrical power cable.

According to an embodiment of the present invention, the processing portion is adapted to process the detected first Rayleigh backscattered light in order to at least determine the value of the current taking into account calibration data or a characteristic curve relating backscatter data to current values.

For performing the calibration or establishing the characteristic curve, plural measurements may be performed employing a known current to a conductor of the electrical power cable and concurrently measuring the first Rayleigh backscattered light and further also processing the first Rayleigh backscatter light, in particular involving to extract a strain component at a predetermined frequency and determine the respective amplitude of the frequency component. The characteristic curve may then for example be defined by (e.g. a fit of) the pairs of the respective strain (amplitude) at a predetermined frequency and the value of the current conveyed in the conductor. Thereby, it may be possible to measure and obtain the current in an absolute value.

According to an embodiment of the present invention, the distributed acoustic sensing equipment further comprises a third optical fibre, in particular arranged along a second cable portion, having a first end and a second end, the first end of the third optical fibre being coupled or coupleable to a second optical fibre connector of the casing to which also the second end of the first optical fibre is coupleable or coupled, the interrogation system being adapted to inject the optical pulses into the third optical fibre via injection into the second optical fibre and further via the first optical fibre and further being adapted to detect third Rayleigh backscattered light returning from the third optical fibre, the third Rayleigh backscattered light being due to Rayleigh backscattering within the third optical fibre; the processing portion being further adapted to process the third Rayleigh backscattered light in order to determine at least one acoustical disturbance along the third optical fibre, in particular indicative of at least one acoustical event at the cable, in particular a second cable portion.

The arrangement may further comprise one or more further optical fibres and one or more further transducers and current sensors which may be configured similar as those described above. Those other current sensors and transducers may be placed at different remote measurement locations in order to allow monitoring or measuring of currents at plural remote locations. Further, in sections of the fibres between the respective measurement locations, additionally distributed acoustic sensing may be performed.

It should be understood that features, individually or in any combination, disclosed, described, explained or provided for an arrangement of obtaining electrical state information related to an electrical power cable, are also, individually or in any combination, applicable to a method of obtaining electrical state information related to an electrical power cable according to embodiments of the present invention and vice versa.

According to an embodiment of the present invention it is provided a method of obtaining electrical state information related to an electrical power cable, the method comprising: generating, by at least one current sensor arrangeable at at least one measurement location, a current sensor signal indicative of a value of an electrical current related to the electrical power cable; generating, by at least one electrical-mechanical transducer arranged in order to receive a current sensor signal based driving signal, a mechanical response at a response surface based on the driving signal; employing a distributed acoustic or vibration sensing equipment, comprising: at least one first optical fibre having a first end and a second end, at least a portion of the first optical fibre between the first end and the second end being mechanically in contact with the response surface; an interrogation system adapted to generate temporally successively optical pulses and coupled to the first end of the first optical fibre; the method further comprising: injecting the optical pulses into the first optical fibre; detecting first Rayleigh backscattered light returning from the first optical fibre at the first end in a time resolved manner; processing the detected first Rayleigh backscattered light in order to at least determine the value of the current.

According to an embodiment of the present invention, the processing the first and/or second and/or third detected light is responsive to time-varying changes of the refractive index of the fibre and provides spatially resolved information due to recording reception times of the backscattered light.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
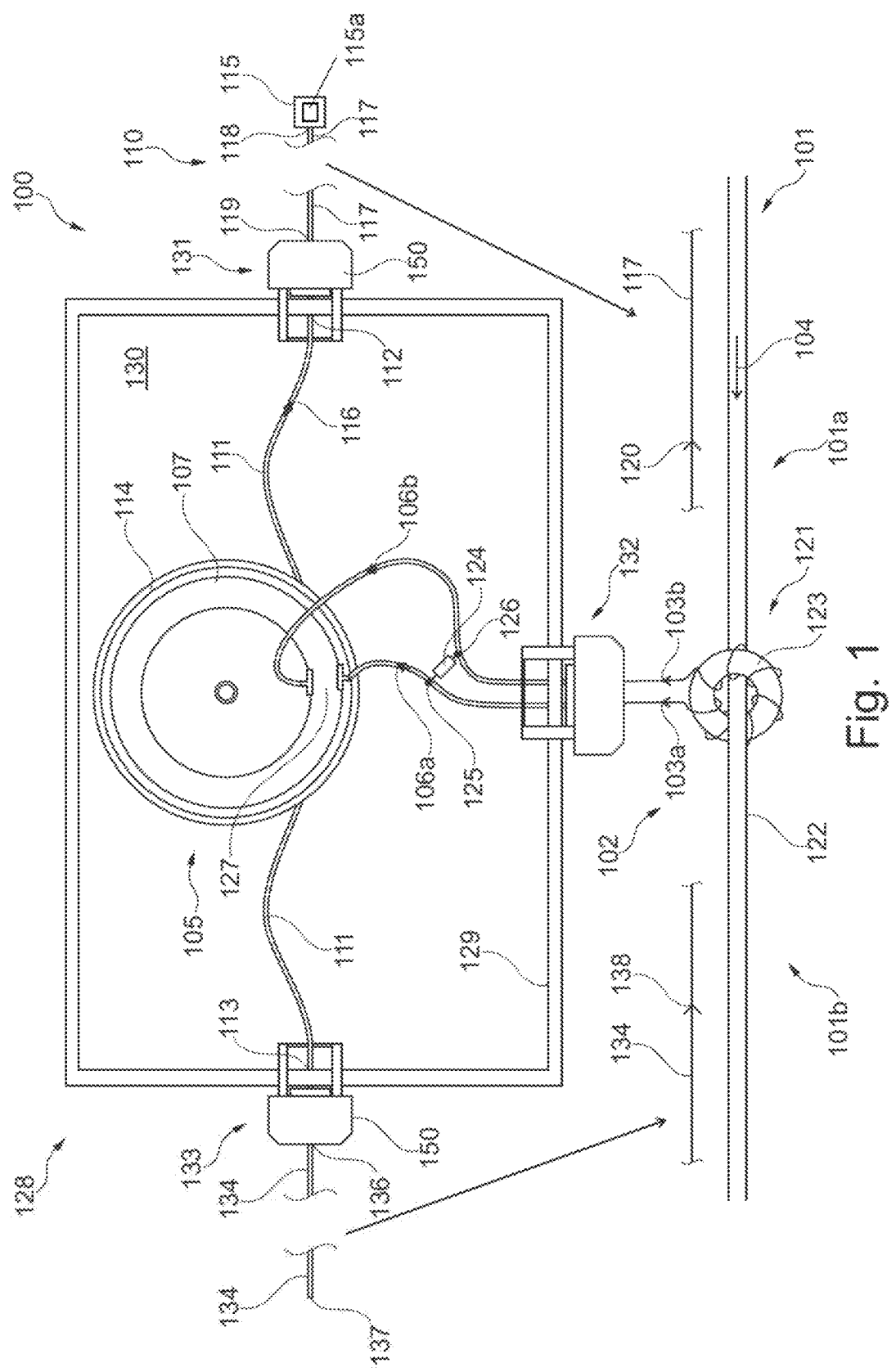
FIG. 1 schematically illustrates an arrangement for obtaining electrical state information related to an electrical power cable according to an embodiment of the present invention.

The illustration in the drawing is schematic. Further, spatially relative terms, such as "front" and "back", "above" and "below", "left" and "right", et cetera are used to describe an element's relationship to another element(s) as illustrated in the Figures. Thus, the spatially relative terms may apply to orientations in use which differ from the orientation depicted in the Figures. Obviously all such spatially relative terms refer to the orientation shown in the Figures only for ease of description and are not necessarily limiting as an apparatus according to an embodiment of the invention can assume orientations different than those illustrated in the Figures when in use.

In the different figures, elements, similar in structure and/or function, are labelled with reference signs differing only in the first digit. A description of one element not in particular or in detail described with respect to one figure may be taken from the description of this corresponding element within the context of another embodiment or figure.

The arrangement 100 for obtaining electrical state information related to an electrical power cable 101 according to an embodiment of the present invention illustrated in FIG. 1 comprises at least one current sensor 102 which is arrangeable at a measurement location and adapted to generate a current sensor signal 103a, 103b indicative of a value of an electrical current 104 related to the electrical power cable 101. The arrangement 100 further comprises at least one electrical-mechanical transducer 105 arranged in order to receive a current sensor signal based driving signal 106a, 106b and being adapted to generate a mechanical response at a response surface 107 based on the driving signal 106a, 106b.

The arrangement 100 further comprises a distributed acoustic sensing (DAS) equipment 110 comprising at least one first optical fibre 111 having a first end 112 and having a second end 113, at least a contact portion 114 of the first optical fibre 111 between the first end 112 and the second end 113 being mechanically in contact with the response surface 107. The DAS equipment 110 further comprises an interrogation system 115 which is adapted to generate temporary successively optical pulses and coupleable to the first end 112 of the first optical fibre 111 in order to inject the optical pulses into the first optical fibre 111. The interrogation system 115 is further adapted to detect first Rayleigh backscattered light 116 returning from the first optical fibre 111 in a time resolved manner. The interrogation 115 further comprises a not in detail illustrated processing portion 115a adapted to process the detected first Rayleigh backscattered light 116, in order to at least determine the value of the current 104.

In the illustrated embodiment, the DAS equipment 110 further comprises a second optical fibre 117 in particular arranged along a first cable portion 101a of the cable 101, having a first end 118 and having a second end 119, the first end 118 of the second optical fibre 117 being coupled to the interrogation system 115, the second end 119 being coupled to the first end 112 of the first optical fibre 111 for allowing optical pulse transfer between the first optical fibre 111 and the second optical fibre 117. Thereby, the interrogation system 115 is further adapted to inject the optical pulses into the first optical fibre 111 via injection into the second optical fibre 117 and further being adapted to detect second Rayleigh backscattered light 120 returning from the second optical fibre 117, the second Rayleigh backscattered light being due to Rayleigh backscattering within the second optical fibre 117. The processing portion of the interrogation system 115 is further adapted to process the second Rayleigh backscattered light 120 in order to determine at least one acoustical disturbance along the second optical fibre 117, in particular indicative of at least one acoustical event at the cable 101.

It is noted that the current sensor 102 is passive and is operable to generate the current sensor signal 103a, 103b without requiring a dedicated power supply. Further, also the electro-mechanical transducer 105 is electrically connected to the current sensor 102 to receive the current sensor signal 103a, 103b as a driving signal and the transducer 105 also does not require a dedicated power supply.

In the illustrated embodiment, the current sensor 102 comprises a secondary coil 121 which is inductively coupled to at least one wire or conductor 122 of interest of the electrical power cable 101 for which the current value is to be determined, the output voltage of the secondary coil 121 providing the current sensor signal 103a, 103b. In the illustrated embodiment, the secondary coil 121 comprises a (optional) magnetic core 123 substantially surrounding the wire 122 of interest.

In the embodiment illustrated in FIG. 1, the current sensor 102 comprises or is connected to a burden resistor 124 which is connected in parallel to the secondary coil 121. The current sensor signal 103a, 103b is a voltage provided between the two terminals 125, 126 parallel to the resistor 124.

The secondary coil 121 senses the current 104 in the wire of interest 122 due to electromagnetic induction. The current sensor 102 therefore is configured as a current transformer.

In the embodiment illustrated in FIG. 1, the electro-mechanical transducer 105 comprises a piezo-element 127 providing the response surface 107 at an outer surface. The response surface 107 has cylinder symmetry (but in other embodiments another shape), in particular a circular cylindrical shape (viewed in FIG. 1 in an elevational view along the symmetry axis of the cylindrical structure). The contact fibre portion 114 of the first optical fibre 111 is thereby (e.g. firmly) wound around the cylinder outer surface 107.

In the embodiment illustrated in FIG. 1, the arrangement 100 comprises a casing 128, a casing wall 129 enclosing a reception space 130. The reception space 130 contains the first optical fibre 111 and the at least one electrical-mechanical transducer 105 including the contact portion 114 of the first optical fibre 111 at least partially in contact to the response surface 107. The casing wall 129 is equipped with a first optical fibre connector 131 (in other embodiments fibres 111, 117 may be spliced e.g. or may be portions of a single integrally formed fibre) allowing to couple the second end 119 of the second optical fibre 117 with the first end 112 of the first optical fibre 111. The casing wall is further equipped with at least one measurement signal input 132 for receiving the current sensor signal 103a, 103b.

In the embodiment illustrated in FIG. 1, the arrangement 100 further comprises a second optical fibre connector 133 allowing to couple the second end 113 of the first optical fibre 111 with a third optical fibre 134. The first and/or second optical fibre connector 131/133 may comprise at least one not in detail illustrated strain relief element. In the embodiment illustrated in FIG. 1, the arrangement 100 comprises a third optical fibre 134 which is in particular arranged along a second cable portion 101b of the electrical cable 101 having a first end 136 and having a second end 137, the first end 136 of the third optical fibre 134 being coupled or coupleable to the second optical fibre connector 133 of the casing 128 to which also the second end 113 of the first optical fibre 111 is coupleable or coupled.

The interrogation system 115 is further adapted to inject the optical pulses into the third optical fibre 134 via injection into the second optical fibre 117 and further via the first optical fibre 111 and further being adapted to detect third Rayleigh backscattered light 138 returning from the third optical fibre 134, the third Rayleigh backscattered light 138 being due to Rayleigh backscattering within the third optical fibre 134. The processing portion is further adapted to process the third Rayleigh backscattered light 138 in order to determine at least one acoustical disturbance along the third optical fibre 134, in particular indicative of at least one acoustical event at the cable, in particular at a second cable portion 135.

The wire or conductor of interest 122 may be a phase current carrying conductor of a power cable or may be an sheath conductor of a power cable, for example.

Figure 2:
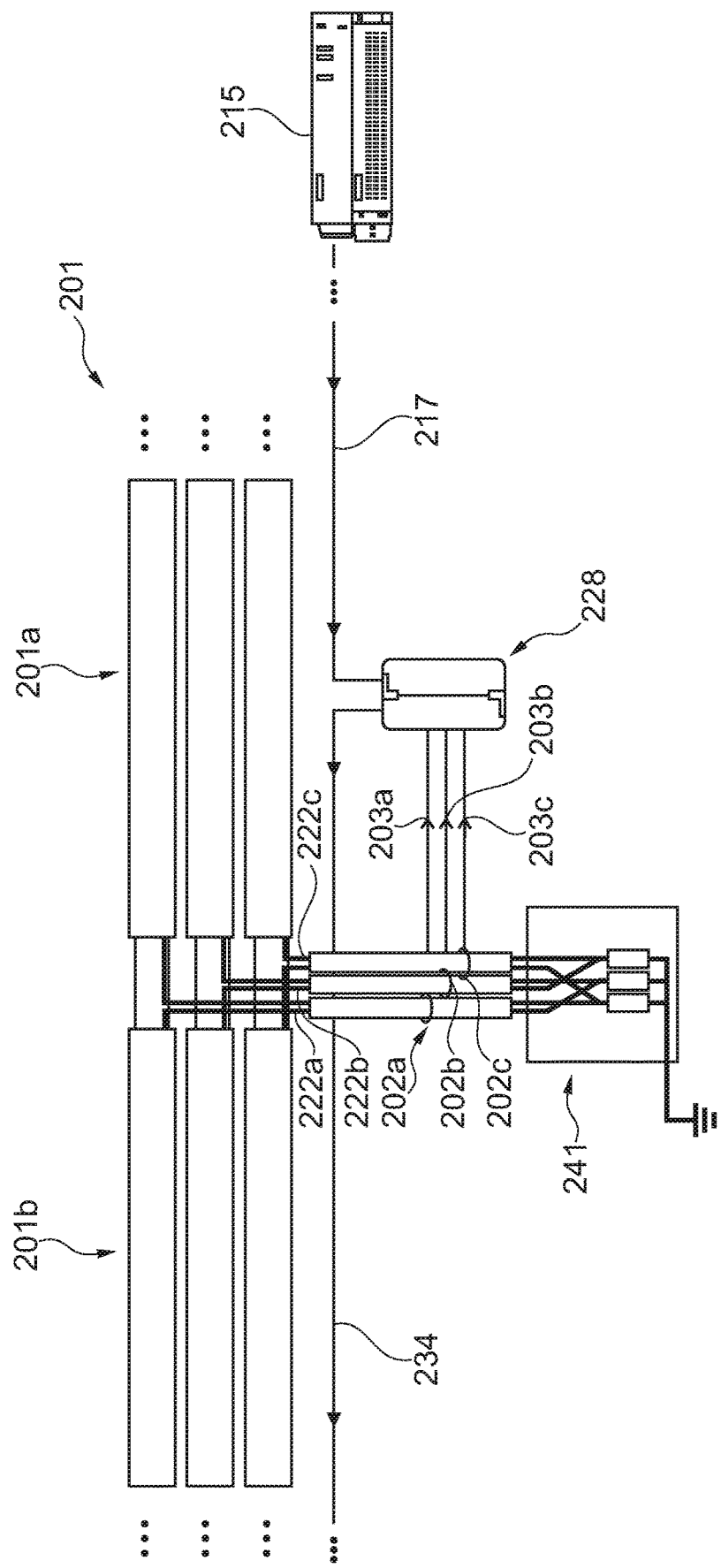
FIG. 2 schematically illustrates an arrangement for obtaining electrical state information related to an electrical power cable according to another embodiment of the present invention.

The arrangement 200 for obtaining electrical state information related to an electrical power cable 201 according to another embodiment of the present invention illustrated in FIG. 2 exhibits similarities to the embodiment illustrated in FIG. 1. However, different from the embodiment illustrated in FIG. 1, three current sensors 202a, 202b, 202c are provided which detect currents in sheath conductors 222a, 222b, 222c being sheath conductors of the high power cable 201, in particular formed by sheath cables around not in detail illustrated phase current carrying high power conductors.

The measurement signals 203a, 203b, 203c (for example voltages and/or currents, respectively) generated by the current sensors 202a, 202b, 202c are supplied to respective measurement signal inputs 232a, 232b, 232c of a casing 228. The measurement signal inputs 232a,b,c may be similarly configured as the measurement signal input 132 illustrated in more detail in FIG. 1. Different from the embodiment illustrated in FIG. 1, the casing 228 comprises three electrical-mechanical transducers 205a, 205b, 205c, as is illustrated in more detail in FIG. 3. Within the reception space 230 of the casing 228, the first optical fibre 211 is integrally formed and comprises the contact portions 214a, 214b, 214c which are in contact or in particular wound around the respective response surfaces 207a, 207b, 207c of the piezo-elements 227a, 227b, 227c.

Figure 3:
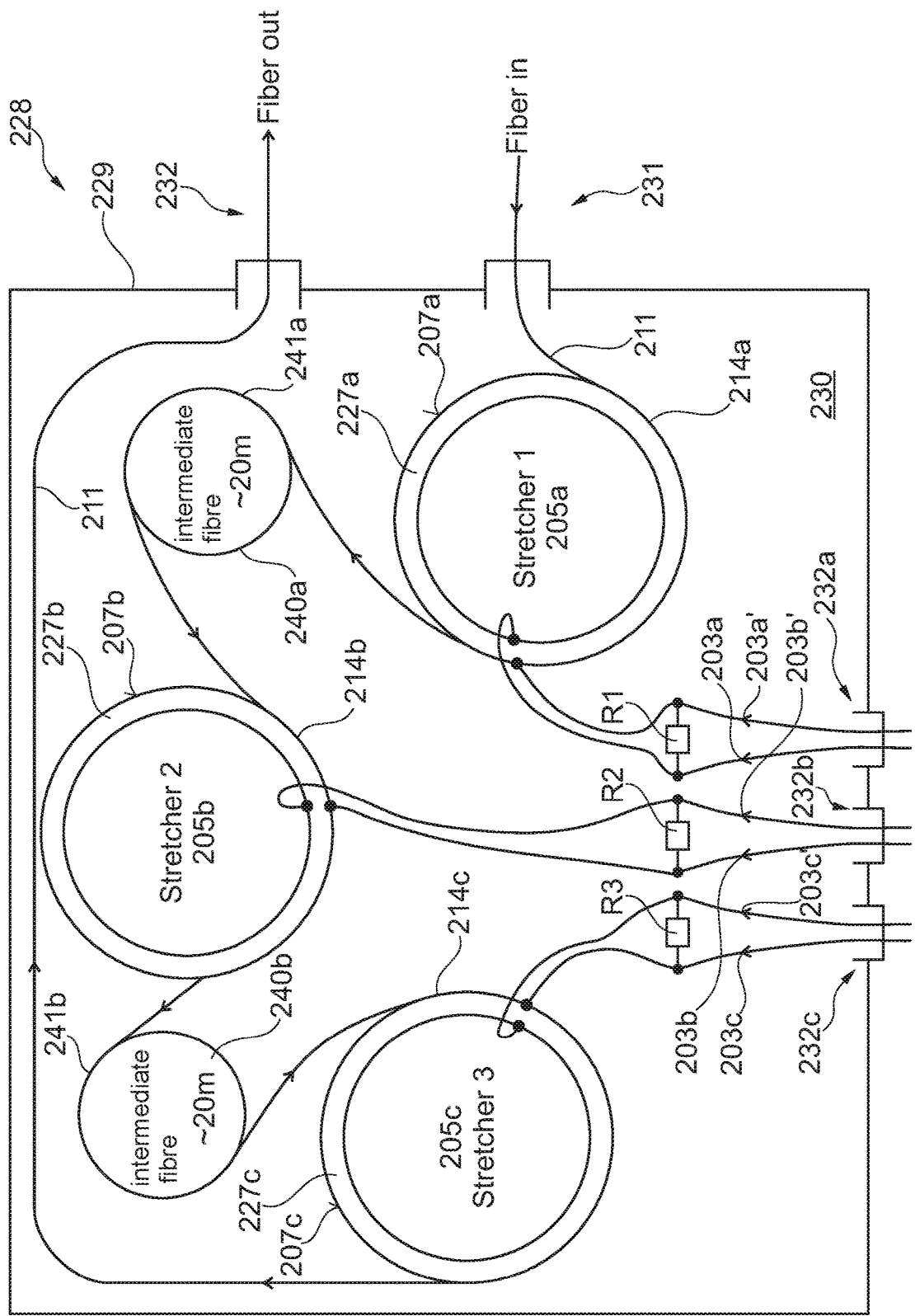
FIG. 3 schematically illustrates a casing with portions of an arrangement for obtaining electrical state information according to an embodiment of the present invention which may for example be employed in the arrangement illustrated in FIG. 2.

In the embodiment illustrated in FIG. 3, the casing 228 comprises or contains in the reception space 230 further (optionally) two fibre spool elements 240a, 240b receiving respective intermediate parts 241a, 241b of the first optical fibre 211 between the respective contact fibre portions. In particular, the intermediate part 241a is a first optical fibre portion between the contact portion 214a and the contact portion 214b and the intermediate part 241b is a stretch of the first optical fibre 211 between the contact portion 214b and the contact portion 214c. The fibre spool elements 240a, 240b may receive the intermediate parts 241a, 241b, for example in that the intermediate parts of the fibre are wound into several turns around the fibre spool elements 240a, 240b. The respective burden resistors are denoted in FIG. 3 with R1, R2, R3.

With further reference to FIG. 2, an example application of the system is illustrated. A distributed acoustic sensing instrument 215 is connected to the optical fibre 217.

The sensing instrument 215 could additionally provide a functionality of BOTDR as DSS (DSS=Distributed Strain Sensing; BOTDR=Brillouin optical-fibre time domain reflectometry) for evaluation of Brillouin backscattering, in order to sense in a distributed manner strain and temperature (DTSS=Distributed Strain and Temperature Sensing).

At a position of interest, here a cross-bonding link box 241, current transformers 202a, 202b, 202c measure the screen currents flowing through the cable into the cross-bonding box 241 and vice versa. The proportional currents in the second circuit are translated via not illustrated burden resistors into proportional voltages that are applied to the fibre stretch elements inside the box 228. The resultant strain information is subsequently read out and further processed by the instrument 215. In particular, the 50 Hz or 60 Hz component of the frequency spectrum as measured by the DAS is analysed. The frequency amplitude is proportional to the effective current flowing in the cable 222a,b,c. A plurality of passive sensor modules can be connected to one optical fibre (or different fibre portions) without interfering each other or the distributed sensor (fibre optic cable) along the route. The number of modules is not limited per se, instead the properties of the DAS are limiting the resolution of the measured currents as well as the possibility of an analysis of events at high frequency (for example MHz (partial discharge)) since the maximum pulse rate is limited by the total sensor fibre length.

Figure 4:
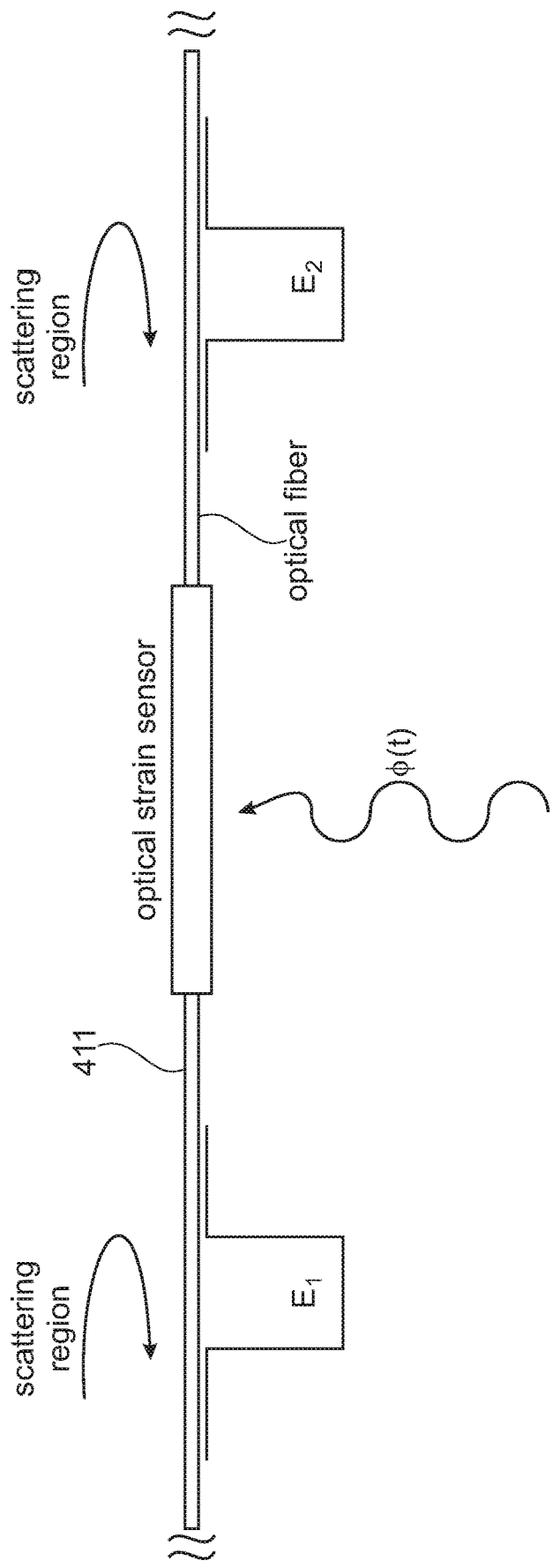
FIG. 4 schematically illustrates an optical fibre for illustrating a measurement principle applied according to embodiments of the present invention.

FIG. 4 illustrates in a schematic manner a measurement principle. Small portions of the injected light (represented by pulses E1, E2) in the fibre optic cable 411 are reflected (Rayleigh backscattered) from random inhomogeneities (scattering regions) along the entire cable route. The receiver in the instrument analyses the Rayleigh backscattered light phase sensitive, which means that the phase information from the backscattered light pulse E2 is subtracted from the backscattered light pulse E1. The resultant relative phase is proportional to the time-varying changes in the refractive index in the section between the position E1 and E2. The introduction of the modulation of the refractive index is achieved via a strain which might be generated by a fibre wound piezoelectric element. Here, the supply voltage of the piezoelectric element might be given by the measurand. As a result, the strain and frequency measured by the DAS instrument is proportional to the time-varying stretch of the fibre wound piezoelectric element and therefore proportional to the measured quantity.

With reference again to FIGS. 1 and 3, a schematic overview of the passive sensor module according to an embodiment of the present invention is illustrated, in particular illustrating or explaining current measurement. A current transformer is connected to the electrical termination 132, a burden resistor 124 scales the applied voltage proportional to the measured current. The wound fibre coil 114 attached to the piezoelectric element 127 translates the applied stretch into the relative phase information read out by the DAS instrument. In order to reduce the phase noise, strain relief elements 150 decouple the sensor modules from the rest of the fibre optic cable. In FIG. 3, multiple fibre stretcher modules can be mounted in one enclosure. Additional fibre spools between the two stretchers can be supplied to prevent signal overlapping. The embodiments may be applied for example to obtain state information of a 110 kV AC power cable. Currents may be measured in different sections of the power cable. Prior to installation, a calibration of the strain to measured current by the current transformer may be required. The size of the resistor (the resistance) determines the conversion factor into the voltage applied to the fibre stretcher and therefore to the strain measured by the DAS.

Embodiments of the present invention provide an apparatus for measuring an electromagnetic quantity in remote locations. This electromagnetic quantity may be proportional to AC currents or AC voltages. Embodiments of the present invention provide a very robust method which is suitable for outdoor use. It can be installed in places without any infrastructure such that electrical supply or network access. An electromagnetic quantity is measured using a passive sensing element and subsequently optically read out using an optical fibre and a strain sensitive fibre optical interrogation system such as a DAS instrument. The passive sensing element comprises a sensor like a current transformer, (optionally) a conditioning circuit to translate the measurand into a proportional voltage signal and a piezoelectric element driven by the voltage signal. A fibre segment attached to the fibre electric element translates the measured signal into a corresponding strain.

Compared to the prior art, embodiments of the present invention provide completely analogue and passive operation without incorporating active electronics and energy harvesting. The system is intended for permanent installation. Embodiments of the present invention do not exploit or perform wavelength dependent reflection of any grating. The passive current sensor may not be sensitive to temperature fluctuations since it typically appears at much lower frequencies than the DAS measurement signal. According to embodiments of the present invention, correct timestamps are not determined and not any time delays between different point sensors are calculated. Prior art systems may suffer from locally interfering fields if e.g. a coated section of a fibre does not build a closed loop around the conductor. Further, retrofit installations are difficult to realize and may require fibre splicing for each sensor.

According to embodiments of the present invention, several transducers are assembled in one box or casing using or resulting in a reduced onsite splice work. Furthermore, split core current transformers can be easily clamped around the conductor without interrupting or disconnecting the life cable.

Embodiments of the present invention may rely on a standard single mode fibre without modification. It is not required to write any structures like gratings onto the fibre, neither to coat the fibre at certain sections. Moreover, embodiments of the present invention provide a passive solution without active electronics. The current sensor may be clamped around a power cable (to measure the load) or an earthing cable or a cable that leads into a cross-bonding box (to measure the screen currents). In case of a cross-bonding point, the cable can also be a sheath cable. The resultant measurands may be transformed into a proportional strain signal subsequently read out by the interrogator. The positions of interest for current sensors might be earthing/cross-bonding boxes, manholes, cable joints, or reference values for Brillouin scattering based temperature sensing instruments and real-time thermal ratings.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. An arrangement for obtaining electrical state information related to an electrical power cable, the arrangement comprising:
   at least one current sensor arrangeable at at least one measurement location and adapted to generate a current sensor signal indicative of a value of an electrical current related to the electrical power cable;
   at least one electrical-mechanical transducer arranged in order to receive a current sensor signal based driving signal and adapted to generate a mechanical response at a response surface based on the driving signal; and
   a distributed acoustic sensing equipment, comprising:
      at least one first optical fibre having a first end and a second end, a contact portion of the first optical fibre between the first end and the second end being mechanically in contact with the response surface;
      an interrogation system adapted to generate temporally successively optical pulses and coupleable to the first end of the first optical fibre in order to inject the optical pulses into the first optical fibre and adapted to detect first Rayleigh backscattered light returning from the first optical fibre in a time resolved manner; and
      a processing portion adapted to process the detected first Rayleigh backscattered light in order to at least determine the value of the current, the distributed acoustic sensing equipment further comprising:
  a second optical fibre arranged along a first cable portion, having a first end and a second end, the first end of the second optical fibre being coupleable to the interrogation system, the second end being coupleable to the first end of the first optical fibre,
  the interrogation system being adapted to inject the optical pulses into the first optical fibre via injection into the second optical fibre and further being adapted to detect second Rayleigh backscattered light returning from the second optical fibre, the second Rayleigh backscattered light being due to Rayleigh backscattering within the second optical fibre, and
  the processing portion being further adapted to process the second Rayleigh backscattered light in order to determine at least one acoustical disturbance along the second optical fibre indicative of at least one acoustical event at the first cable portion.

2. The arrangement according to claim 1, wherein at least one of the following holds:
  the current sensor is passive and is operable to generate the current sensor signal without requiring a dedicated power supply;
  the electrical-mechanical transducer is electrically connected to the current sensor to receive the current sensor signal as the driving signal;
  the electrical-mechanical transducer is driven by the current sensor signal without requiring a dedicated power supply.

3. The arrangement according to claim 1, wherein the current sensor comprises a coil inductively coupled to at least one wire of interest of the electrical power cable for which the current value is to be determined, at least one of the output voltage and current of the coil providing the current sensor signal, wherein the coil substantially surrounding the wire of interest.

4. The arrangement according to the claim 3, wherein the current sensor comprises a burden resistor connected in parallel to the coil, the current sensor signal being a voltage provided between two terminals parallel to the resistor.

5. The arrangement according to claim 1, wherein the current sensor is responsive to a temporal change of the current value and exploits voltage induction caused by the current.

6. The arrangement according to claim 1,
  wherein the current sensor is configured as a current transformer.

7. The arrangement according to claim 1, wherein the current sensor is arranged to measure a value of at least one of an earth and sheath conductor current carried in an earth conductor of the electrical cable.

8. The arrangement according to claim 1, wherein at least one of the following holds:
  the electrical-mechanical transducer comprises a piezo-electrical-element providing the response surface at an outer surface;
  the piezo-electrical element has any aspect ratio and shape;
  the piezo-electrical element comprises a stack of piezo members;
  the fibre is glued straight to the stack of piezo members;
  the piezo-element is configured as a bending actuator at least one of pinging and exciting vibration in the fibre;
  the response surface substantially has a cylinder symmetry, wherein a contact fibre portion of the first optical fibre is wound around the cylinder outer surface.

9. The arrangement according to claim 1, further comprising:
  a casing having a casing wall enclosing a reception space, the reception space containing the at least one electrical-mechanical transducer including the contact portion of the first optical fibre at least partially in contact to the response surface, the current sensor being arranged outside the reception space,
  the casing wall being equipped with:
    a first optical fibre connector allowing to couple the second end of the second optical fibre with the first end of the first optical fibre;
    at least one measurement signal input for receiving the at least one current sensor signal.

10. The arrangement according to the claim 9, wherein at least one of the following holds:
  the casing wall being further equipped with a second optical fibre connector allowing to couple the second end of the first optical fibre with a third optical fibre;
  at least one of the first optical fibre connector and second optical fibre connector comprising at least one strain relief element;
  at least one strain relief separate from at least one of the first optical fibre connector and the second optical fibre connector.

11. The arrangement according to claim 10, wherein at least one of the following holds:
  the reception space further contains at least one further electrical-mechanical transducer having a further response surface with which a further contact portion of the first optical fibre is in contact, the further electrical-mechanical transducer being driven by a further driving signal which is based on a further current sensor signal generated by a further current sensor;
  at least one fibre spool element holding/receiving an intermediate part of the first optical fibre between the contact fibre portion and the further contact fibre portion of the first optical fibre.

12. The arrangement according to claim 1, wherein the processing portion is configured to process the detected first Rayleigh backscattered light by:
  extracting at least one frequency component corresponding to an AC frequency of the current expected to by carried in a wire of interest of the electrical cable;
  determining an amplitude of the frequency component.

13. The arrangement according to claim 12, wherein the determined amplitude at at least one of 50 Hz and 60 Hz is proportional to the current to be measured.

14. The arrangement according to claim 1,
  wherein the processing portion is adapted to process the detected first Rayleigh backscattered light in order to at least determine the value of the current taking into account calibration data relating backscatter data to current values.

15. The arrangement according to claim 1, the distributed acoustic sensing equipment further comprising:
  a third optical fibre arranged along a second cable portion, having a first end and a second end, the first end of the third optical fibre being coupleable to a second optical fibre connector of the casing to which also the second end of the first optical fibre is coupleable,
  the interrogation system being adapted to inject the optical pulses into the third optical fibre via injection into the second optical fibre and further via the first optical fibre and further being adapted to detect third Rayleigh backscattered light returning from the third optical fibre, the third Rayleigh backscattered light being due to Rayleigh backscattering within the third optical fibre;

the processing portion being further adapted to process the third Rayleigh backscattered light in order to determine at least one acoustical disturbance along the third optical fibre indicative of at least one acoustical event at the second cable portion.

16. A method of obtaining electrical state information related to an electrical power cable, the method comprising:

generating, by at least one current sensor arrangeable at at least one measurement location, a current sensor signal indicative of a value of an electrical current related to the electrical power cable;

generating, by at least one electrical-mechanical transducer arranged in order to receive a current sensor signal based driving signal, a mechanical response at a response surface based on the driving signal;

employing a distributed acoustic sensing equipment, comprising:

at least one first optical fibre having a first end and a second end, at least a contact portion of the first optical fibre between the first end and the second end being mechanically in contact with the response surface;

an interrogation system adapted to generate temporally successively optical pulses and coupled to the first end of the first optical fibre;

the method further comprising:

injecting the optical pulses into the first optical fibre;

detecting first Rayleigh backscattered light returning from the first optical fibre at the first end in a time resolved manner;

processing the detected first Rayleigh backscattered light in order to at least determine the value of the current, the distributed acoustic sensing equipment further comprising:

a second optical fibre arranged along a first cable portion, having a first end and a second end, the first end of the second optical fibre being coupleable to the interrogation system, the second end being coupleable to the first end of the first optical fibre, the interrogation system being adapted to inject the optical pulses into the first optical fibre via injection into the second optical fibre and further being adapted to detect second Rayleigh backscattered light returning from the second optical fibre, the second Rayleigh backscattered light being due to Rayleigh backscattering within the second optical fibre, and the processing portion being further adapted to process the second Rayleigh backscattered light in order to determine at least one acoustical disturbance along the second optical fibre indicative of at least one acoustical event at the first cable portion.

17. The method according to claim 16, wherein the processing the first detected light is responsive to time-varying changes of the refractive index of the fibre and provides spatially resolved information due to recording reception times of the backscattered light.

* * * * *